United States Patent [19]
Farmer

[11] 4,207,782
[45] Jun. 17, 1980

[54] MULTI-CONDUCTOR INSULATION STRIPPING APPARATUS

[75] Inventor: Cloyd C. Farmer, St. Cloud, Fla.
[73] Assignee: Brunswick Corporation, Skokie, Ill.
[21] Appl. No.: 929,841
[22] Filed: Jul. 31, 1978
[51] Int. Cl.² .............................................. H02G 1/12
[52] U.S. Cl. ................................................... 81/9.51
[58] Field of Search ............................. 89/9.5 R, 9.51

[56] References Cited
U.S. PATENT DOCUMENTS

| | | | |
|---|---|---|---|
| 2,285,167 | 6/1942 | Montgomery | 81/9.51 |
| 3,376,627 | 4/1968 | Sitz | 81/9.51 X |
| 3,786,697 | 1/1974 | Abarotin | 81/9.51 |
| 4,074,596 | 2/1978 | Mihulka | 81/9.51 |
| 4,084,310 | 4/1978 | Dragisic | 81/9.51 X |

*Primary Examiner*—James G. Smith
*Attorney, Agent, or Firm*—Duckworth, Hobby & Allen

[57] ABSTRACT

Apparatus for stripping insulation from each insulated conductor in a multi-conductor wiring harness, includes a frame with a setup bar movably positioned across the frame and a clamp position along the bar. The clamp is locked at different preselected points along the setup bar, and the harness is held against the clamp. A movable cutting blade is mounted with the frame so as to cut in a direction substantially transverse to the setup bar. The blades are moved in the cutting direction and only through the insulation of one of the conductors, while the setup bar is driven away from the blades while the blades are engaged with the insulation so as to simultaneously force the clamp away from the blade thereby stripping the insulation from the conductor.

21 Claims, 6 Drawing Figures

MULTI-CONDUCTOR INSULATION STRIPPING APPARATUS

BACKGROUND OF THE INVENTION

1. Field of the Invention

The present invention relates generally to machines which are adapted to strip insulation from electrical conductors, and in particular, relates to semi-automatic apparatus which is adapted to be quickly set up to strip the insulation from a number of conductors in a multi-conductor wiring harness so as to leave different lengths of insulated conductors in the harness.

2. Description of the Prior Art

There are a number of hand tools which are specifically designed to strip insulation from insulated conductors. These tools are generally portable in nature and are not designed for high speed continous manufacturing operations.

The prior art teaches a number of machines which permit the semi-automatic stripping of insulation from electrical conductors, or the stripping of metallic braiding. Typical of this prior art are the arrangements disclosed in the following two U.S. Pat. Nos. 3,706,242 to Wright, et al.; and 2,929,285 to Gulemi.

A specific problem related to semi-automatic wire stripping machines used in manufacturing operations is the requirement that the apparatus be designed so as to permit rapid stripping operations in a safe and convenient manner. In regards to safety, it is particularly important that the machine be designed for "hands free" operation after setup, and during the cutting and stripping functions.

SUMMARY OF THE INVENTION

The present invention contemplates apparatus specifically adapted for stripping insulation from each insulated conductor in a multi-conductor wiring harness, and comprises a frame having a setup bar extending across the frame with a clamp positioned along the setup bar. Means are further provided for locking the clamp at a preselected point along the setup bar, with means for holding the harness against the clamp. A movable cutting blade is mounted with the frame so as to cut in a direction substantially transverse to the setup bar. Means are provided for moving the blades along the cutting direction through the insulation of one of the conductors, and additional means are provided for driving the setup bar away from the blade while the blade is in engagement with the insulation so as to simultaneously force the clamp away from the blade to thereby strip the insulation from the conductor.

In a preferred embodiment of the present invention, the driving means further comprises means for driving the setup bar in a direction axial with the bar, and is restricted against axial rotation of the setup bar during movement in the axial direction. Suitably, the preferred embodiment includes means for initiating operation of the driving means responsive to movement of the blade.

The preferred embodiment of the present invention includes a second blade which is adapted to trim off the extremity of the conductor being stripped simultaneously with the stripping operation. Suitably, the driving means for the setup bar, the harness clamp, and the blade moving means are all actuated by pressurized fluid cylinders.

An important aspect of the present invention is the utilization of means which permits relatively quick setup of the harness being operated upon, and "hands free" operation of the apparatus during the cutting and stripping operations. To this end, the preferred embodiment of the apparatus of the present invention utilizes two separate switches adapted to independently initiate the operation of separate functions. A first one of the switches energizes one pressurized fluid cylinder associated with the clamp, forcing a harness press against the harness to lock the harness against the clamp. The second switch, which operates independently of the first switch, is adapted to energize the blade moving means. The driving means is then coupled with the blade moving means so as to be energized responsive to operation thereof. In this way, the relative safety of the operator is assured. Suitably, the first switch would be operated by foot pressure, and the second switch would be energized by one of the hands of the operator, thus insuring that the operator's hands are free of the wire stripping apparatus before the stripping operation is initiated.

Finally, the clamp is movable along a fixed guide rod, and is adapted to engage slots in the setup bar, so as to change the length of the conductor which is being trimmed and stripped. Indicator means, in the form of a color code or similar indicia, may be positioned on the frame to identify for the operation the particular position at which the clamp is to be engaged with the setup bar.

THE DRAWING

DETAILED DESCRIPTION OF THE PREFERRED EMBODIMENT

Figure 1:
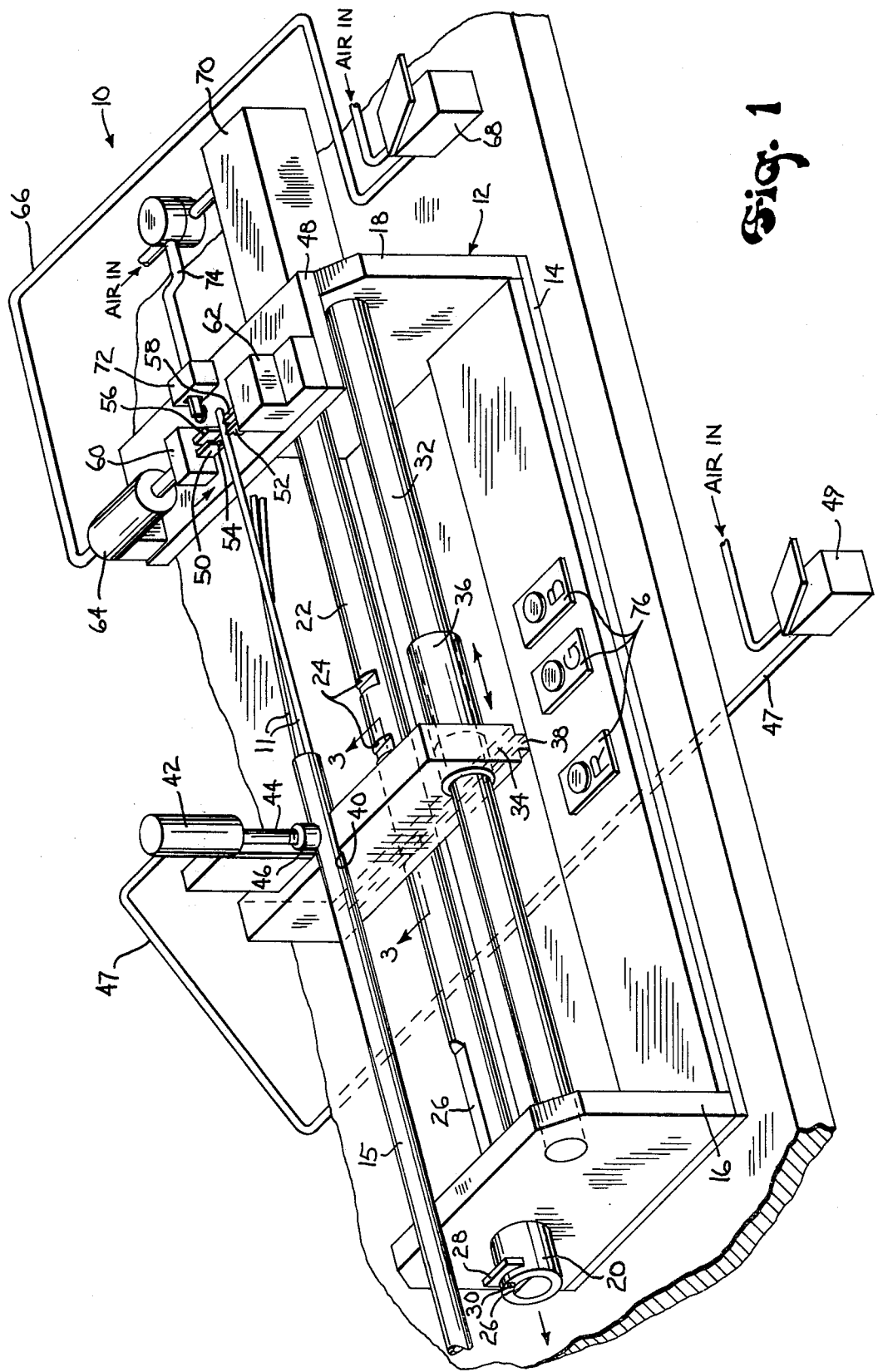
FIG. 1 is a prospective view of a preferred embodiment of wire stripping apparatus in accordance with the present invention.
Figure 2:
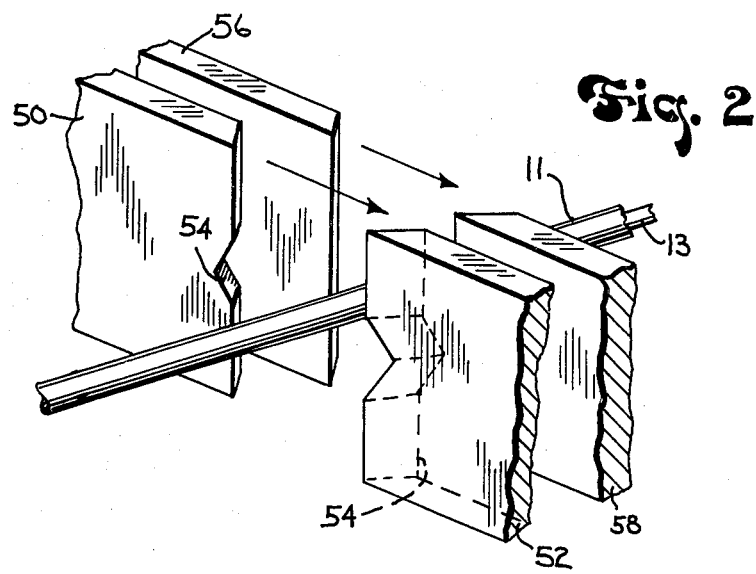
FIG. 2 is a prospective view of a portion of the apparatus shown in FIG. 1.

A preferred embodiment of the present invention will now be described with reference to the drawing.

Noting FIG. 1, the cable stripping apparatus, referred to generally by the reference 10, is adapted to strip insulation 11 from the conductor 13 associated with a wiring harness 15.

The apparatus 10 includes a frame 12 which is preferably formed of a high tensile strength metal and having a U-shaped appearance including a bottom 14 and opposing, parallel sides 16, 18. The frame 12 includes a collar 20 positioned in the side 16.

With continuing reference to FIG. 1, the apparatus 10 further includes a setup bar 22 movably supported between the sides 16, 18. The setup bar 22 has a plurality of transverse slots 24 extending across the top surface thereof. The setup bar 22 and the collar 20 are provided with a rotation restricter arrangement which includes a flat 26 on the end of the setup bar 22 extending through the collar and the side 16. A key 28 extends through an associated keyway transverse to the axis of the setup bar 22, and a set screw 30 extends through the collar axially with the setup bar 22 to hold the key 28 in position. As shown in the left-hand side of FIG. 1, the key 22 engages the flat 26, thereby preventing axial rotation of the setup bar 22 during insulation stripping operations, as is further described below.

Figure 3:
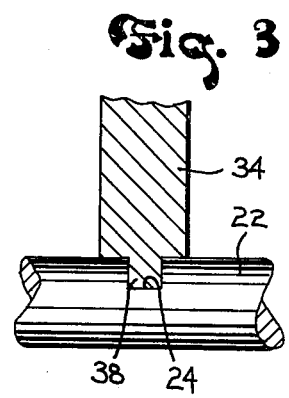
FIG. 3 is a side elevation of a portion of the apparatus shown in FIG. 1, partially in cross-section.

The apparatus 10 further includes a slide rod 32 fixed between the sides 16, 18 and parallel with the setup bar 22. A clamp 34 having a sleeve 36 movably secured about the slide rod 32 is further provided, the clamp having an integral clamp key 38 extending across the bottom of the clamp 34 and adapted to engage slots 24 in the setup bar, as is shown in FIG. 3. The clamp 34 further includes an indentation 40 across the top thereof which is adapted to receive the harness 15, which harness includes the plural conductors 13 having insulation 11 thereon.

An air cylinder having a shaft 44 with a harness press 46 at the extremity thereof is fitted with the apparatus 10 above the clamp 34 such that pressurization of the cylinder 42 drives the shaft 44 in the direction of a harness 15, thus securely holding the harness 15 in the indentation 40. The air cylinder 42 is fitted with an air line 47 coupled to a pressure switch 49 which permits operation of the air cylinder 42. As is particularly shown in FIG. 1, the switch 49 is adapted to be located underneath the table (shown but not numbered in FIG. 1) upon which the frame 12 rests. In this manner, the switch 49 may be operated by the foot of the operator of the apparatus 10.

With specific reference to the right-side of FIG. 1, and FIGS. 4–6, the apparatus 10 further includes a support plate 48. A first pair of opposing, parallel cutting blades 50, 52 are carried by the support plate 48, each blade in the first pair having a respective notch 54 therein which permits restricted cutting of only the insulation 11 about the conductor 13, as will be described below in greater detail. The apparatus 10 further includes a second pair of parallel, opposing cutting blades 56, 58 which are, in turn, parallel to and spaced from the first pair of blades 50, 52. The blades 50, 56 are supported by a movable block 60 which is coupled to the shaft of an air cylinder 64. The remaining two blades 52, 58 are supported by a stationary support block 62. The air cylinder 64 includes an air line 66 and a switch 68 which is positioned adjacent to frame 12 so as to be actuated by the hand of the operator, thereby beginning the stripping cycle, as will be described in detail below.

Figure 4:
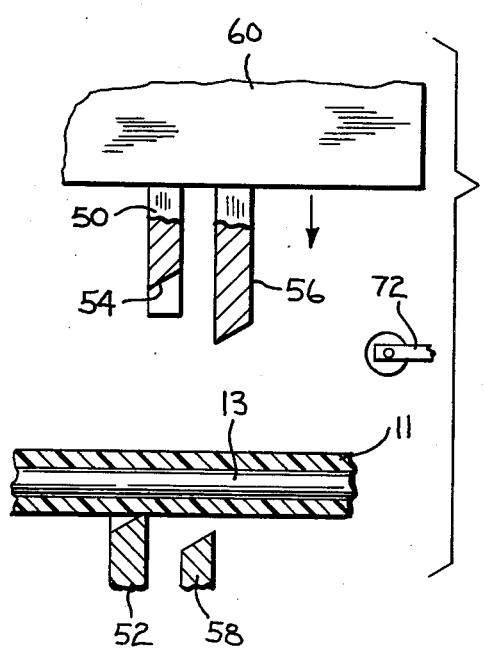
FIGS. 4, 5 and 6 illustrate the operation of the wire stripping apparatus in accordance with the present invention.
Figure 5:
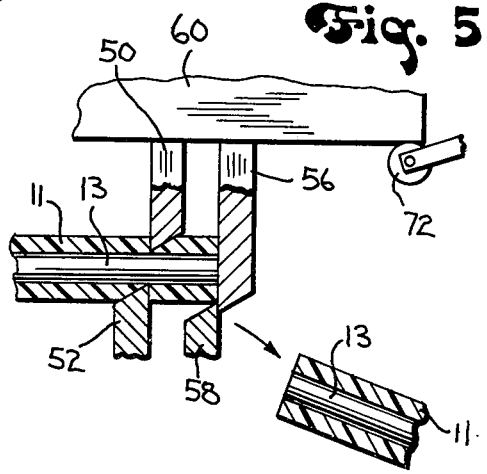
Figure 6:
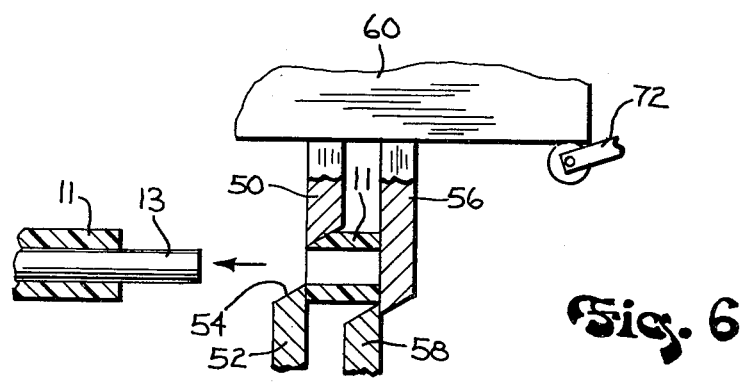

The apparatus 10 further includes an air cylinder 70, having a shaft axially coupled to the setup bar 22 to drive the setup bar in an axial direction toward the collar 20 upon pressurization of the cylinder 70. A micro-switch 72 associated with the cylinder 70 via an air line 74 permits pressurization of the cylinder 70 responsive to movement of the support block 60 associated with the cutting blades. In this regard, FIGS. 4, 5 and 6 show the relative position of the micro-switch 72 during the cutting operation.

Plural indicators such as color coded discs and associated letters 76 permit the operator to identify a corresponding slot 24 in the setup bar, the color coding corresponding to a color of the insulation 11 on one of the conductors 13 and the wire harness 15. In this way, the operator can identify the setup position of the clamp 34 for each individual conductor in the harness 15, should the manufacturing requirements associated with the stripping operation require different lengths for each conductor.

Preferably, the pressurized fluid cylinder 42, 64 and 70 are cushioned air cylinders.

Operation of the apparatus 10 will now be described with reference to the drawing.

Initially, the first air cylinder 42 is depressurized, permitting the shaft 44 and harness press 46 to be in an open position. Likewise, the second and third air cylinders 64 and 70 are pressurized, maintaining the cutting blades 50, 52 and 56, 58 in an open position; and further maintaining the setup bar 22 in a stationary position.

The operator places the harness 15 to be cut lengthwise across the frame 12 parallel with the setup bar 22. The operator then presses the first switch 49, causing the cylinder 42 to be pressurized, and the harness press 46 to force the harness 15 in the indentation 40.

The operator then places a first one of the conductors to be stripped between the cutting blades. The operator then moves his or her hands away from the vicinity of the cutting blades, using one hand to energize the hand switch 68. This pressurizes the second air cylinder 64, causing the shaft associated therewith to drive the support block 60 toward the stationary block 62.

As is shown in FIGS. 4, 5 and 6, the second pair of cutting blades 56, 58 engage the extremity of the conductor 13, severing that extremity. At the same time, the first pair of cutting blades 50, 52 extend through the insulation 11 of the conductor 13, but because of the limited range of the blades as determined by the notch 54, the blades only extend to the insulation 11 and do not sever the conductor 13.

As is shown in FIGS. 4, 5 and 6, motion of the movable block 60 toward the insulated conductor 13 causes that block 60 to engage the micro-switch 72. Activation of this micro-switch energizes the third air cylinder 70, driving the setup bar 22 toward the first side 16 and the collar 20. The result of this motion of the setup bar 22 causes the setup bar, the clamp 34 coupled thereto, and consequently the harness 15 to be driven away from the second pair of cut off blades 50, 52, thus stripping the insulation 11 from the conductor 13.

Noting FIG. 3, it will be seen that the operator may utilize the indicator 76 to determine in which of the slots 24 the key 38 associated with the clamp 34 is positioned, thereby changing the length of the conductor 13 being stripped, with respect to the length of the other conductors in the harness 15.

I claim:

1. Apparatus for stripping insulation from each insulated conductor in a multi-conductor wiring harness, comprising:

a frame;

a setup bar extending across said frame;

a clamp positioned along said setup bar;

means, including plural indentations along said setup bar each adapted to receive said clamp, for locking said clamp at a preselected point along said setup bar;

means for holding said harness against said clamp;

a movable cutting blade mounted with said frame so as to cut in a direction substantially transverse to said setup bar;

means for moving said blade along said cutting direction through said insulation of one of said conductors; and means for driving said setup bar away from said blade while said blade is in engagement with said insulation, so as to simultaneously force said clamp away from said blade to thereby strip said insulation from said conductor.

2. The apparatus recited in claim 1 where said driving means further comprises means for driving said setup bar in a direction axial with said bar.

3. The apparatus recited in claim 2 further comprising means for restricting axial rotation of said setup bar during movement in said axial direction.

4. The apparatus recited in claim 3 wherein said frame includes a collar surrounding a portion of said setup bar, said axial restricting means comprising:
   said portion of said setup bar having a slot therein;
   said collar having a keyway therein transverse to said axial direction and adjacent said slot;
   a key extending through said keyway and into engagement with said bar at said slot; and
   means for locking said key in said keyway.

5. The apparatus recited in claim 1 further comprising:
   means for initiating operation of said driving means responsive to movement of said blade.

6. The apparatus recited in claim 5 wherein said driving means comprises a shaft coupled with said setup bar.

7. The apparatus recited in claim 6 wherein said initiating means comprises a switch in the path of said blade, said switch coupled for actuation of said shaft.

8. The apparatus recited in claim 7 wherein initiating means includes a pressurized fluid shaft for actuating said shaft.

9. The apparatus recited in claim 5 further comprising a hand-operated switch for initiating operation of said blade 10. The apparatus recited in claim 9 wherein said blade moving means comprises a movable shaft with said blade fixed at the extremity thereof.

11. The apparatus recited in claim 10 wherein said blade moving means further includes a pressurized fluid cylinder for moving said shaft along said direction transverse to said setup bar.

12. The apparatus recited in claim 9 further comprising a foot-operated switch for initiating operation of said holding means.

13. The apparatus recited in claim 1 further comprising a slide rod extending across said frame and parallel with said setup bar, said clamp slidably coupled with said slide rod.

14. The apparatus recited in claim 1 further comprising indicating means on said frame corresponding to a coding of said conductors and adjacent each indentation to indicate a preselected conductor in said harness.

15. The apparatus recited in claim 1 further comprising a second blade parallel to, and carried with said one blade for trimming the extremity of each conductor in said harness.

16. Apparatus for simultaneously stripping insulation from an insulated conductor and trimming an extremity of said conductor, said apparatus comprising:
   a frame;
   a bar movably supported by said frame;
   means for clamping said insulated conductor with said bar, said clamping means further including means for clamping said insulated conductor at different preselected points along said bar;
   a first pair of parallel and opposing cutting blades carried by said frame;
   a second pair of parallel and opposing cutting blades carried by said frame in parallel, spaced relation with respect to said first cutting blade pair, said second pair being spaced further from said clamping means than said first pair, both pairs of cutting blades being dimensioned to permit said clamped insulated conductor to be inserted therebetween;
   means for moving at least one of said first and second pairs of cutting blades into engagement with said insulated cable;
   means for restricting cutting by said first cutting blade pair only through said insulation surrounding said cable; and
   means for driving said bar away from said blades while said first cutting blade pair is in engagement with said insulation, and following severing of said conductor extremity by said second cutting blade pair.

17. The apparatus recited in claim 16 further comprising means for initiating operation of said driving means responsive to operation of said cutting blade moving means.

18. The apparatus recited in claim 16 further comprising means for restricting axial rotation of said setup bar during movement in said axial direction.

19. The apparatus recited in claim 16 further comprising a slide rod extending across said frame and parallel with said clamp slidably coupled with said sliding rod.

20. Apparatus for stripping insulation from each insulated conductor in a multi-conductor wiring harness comprising:
   a frame;
   a setup bar extending across said frame;
   a clamp positioned along said setup bar, said clamp further including means for clamping said insulated conductor at different preselected points along said bar;
   a slide rod extending across said frame and parallel with said setup bar, said clamp slidably coupled with said slide rod;
   means for locking said clamp at a preselected point along said setup bar;
   means for holding said harness against said clamp;
   a first switch for initiating operation of said holding means;
   a first pair of parallel and opposing cutting blades carried by said frame;
   a second pair of parallel and opposing cutting blades carried by said frame in parallel, spaced relation with respect to said first cutting blade pair, since second pair being spaced further from said clamping means than said first pair, both pairs of cutting blades being dimensioned to permit said clamped insulating conductor to be inserted therebetween;
   means for moving said blades along a cutting direction toward said conductor;
   means for restricting cutting by said first cutting blade pair only through said insulation surrounding said conductor;
   means for driving said setup bar away from said blades while said first cutting blade pair is engaged with said insulation; and
   a second switch for initiating operation of said driving means independent of operation of said first switch.

21. Apparatus for stripping insulation from an insulated conductor, comprising:
   a frame;
   a bar extending across said frame;
   means for clamping said insulated conductor at different pre-selected points along said bar;
   a cutting blade;
   means for mounting said blade so as to cut in a direction substantially transverse to said insulated conductor;
   means for moving said blade along said cutting direction through said insulation of said conductor; and
   means for driving said bar away from said blade while said blade is in engagement with said insulation, so as to simultaneously force said conductor away from said blade to thereby strip said insulation therefrom.

* * * * *